(12) United States Patent
Lai

(10) Patent No.: US 6,665,099 B1
(45) Date of Patent: *Dec. 16, 2003

(54) DEVICE AND METHOD FOR CONTROLLING LIGHT EXPOSURE

(75) Inventor: Jiunn-Yiing Lai, Taipei Hsien (TW)

(73) Assignee: Primax Electronics Ltd., Taipei Hsien (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,873

(22) Filed: Apr. 15, 1998

(30) Foreign Application Priority Data

Mar. 5, 1998 (TW) ................................ 87103177 A

(51) Int. Cl.[7] ................................................ H04N 1/04
(52) U.S. Cl. ....................... 358/475; 358/471; 358/474
(58) Field of Search ................................ 358/475, 474, 358/512, 513, 514, 382, 383

(56) References Cited

U.S. PATENT DOCUMENTS

| 4,639,608 A | * | 1/1987 | Kuroda | 358/294 |
|---|---|---|---|---|
| 4,658,303 A | * | 4/1987 | Nagano | 358/294 |
| 4,837,614 A | * | 6/1989 | Omi | 358/75 |
| 4,839,719 A | * | 6/1989 | Hirota et al. | 358/75 |
| 4,939,578 A | * | 7/1990 | Kano | 358/482 |
| 5,550,653 A | * | 8/1996 | TeWinkle et al. | 358/514 |
| 5,592,222 A | * | 1/1997 | Nakamura et al. | 358/514 |
| 5,650,864 A | * | 7/1997 | Tseng et al. | 358/475 |
| 5,701,505 A | * | 12/1997 | Yamashita et al. | 358/514 |

OTHER PUBLICATIONS

Technologien; Def. of CIS and CCD; www.leimbert.de/semester.noframe/tcis.*
Technical Dictionary; Def. of CCD.*
Scanner Outlet; frequently asked questions; Def. CCD.*

* cited by examiner

Primary Examiner—Jerome Grant, II
(74) Attorney, Agent, or Firm—J. C. Patents

(57) ABSTRACT

A light exposure control device and method that allows three excitation signals to be generated by a counter and sent to a CCD module after the CCD module has been exposed to an image. Inside the CCD module, a red photodetector, a green photodetector and a blue photodetector can be separately triggered to capture the necessary image signals. The excitation signals sent to each CCD photodetector are independent from each other. Furthermore, each CCD photodetector reacts only to a specific excitation signal. Therefore, constraints caused by unrelated excitation signals are avoided, and so exposure time can increase considerably.

8 Claims, 4 Drawing Sheets

DEVICE AND METHOD FOR CONTROLLING LIGHT EXPOSURE

CROSS-REFERENCE TO RELATED APPLICATION

This application claims the priority benefit of Taiwan application Ser. No. 87103177, filed Mar. 5, 1998, the full disclosure of which is incorporated herein by reference.

BACKGROUND OF THE INVENTION

1. Field of Invention

The present invention relates to a light exposure device and its operation. More particularly, the present invention relates to a light exposure control device suitable for scanners that provides independent excitation signals for triggering each photodetector such as, for example, a charge coupled device (CCD).

2. Description of Related Art

A charge coupled device (CCD) is a kind of semiconductor device. When a CCD is illuminated by a light source, the intensity of the photons is transformed into a quantity of accumulated electric charges. In general, the stronger the intensity of light beam shining on a CCD, the greater the amount of electric charges generated by the CCD will be. Therefore, the amount of electric charges stored inside a CCD will vary according to the intensity of external light. Utilizing the light intensity/electric charge relationship, a vast number of these CCDs can be arranged systematically into an array forming a CCD module. When photons coming from a light source strike a picture, a corresponding light image is formed. If a photosensitivity CCD module is positioned to receive light signals from the image, image data can be captured. After some transformations of the image data, the transformed image data can be used in a number of applications. For example, a scanner can rely on photosensitive CCD modules to extract a color image from a picture. The method of image extraction includes utilizing three CCD photodetector strips, which are sensitive to red, green and blue light respectively, in the CCD module. During light scanning operation, the red, green and blue lights coming from the image are captured by the corresponding photodetectors in the CCD module. The three primary colors of an image captured by the CCD module are then output to a converter for transforming the image into digital data. Next, the digitized data of the three primary colors are re-grouped, re-creating the original image received from the CCD module. The output of image signals from the CCD module is controlled by an excitation signal. Whenever the CCD module receives an excitation signal, one of the three primary colors from the image is captured.

FIG. 1A illustrates the method of excitation for a conventional CCD module. As shown in FIG. 1A, the CCD module 10 has three CCD photodetector strips. In the fabrication of CCD photodetectors, three different photodetectors each having sensitivity for a particular part of the color spectrum can be separately manufactured so that the three primary colors can be registered. Subsequently, when the three primary colors of the image captured by the photodetectors are recombined, the originally exposed color can be reproduced. The extraction of three primary colors red, green and blue are carried out by a red photodetector 100, a green photodetector 110 and a blue photodetector 120 respectively. In operation, when the picture 4 is illuminated by light source 2, exposure signals 6 will be generated and in turn are sent to the CCD module. Since the exposure signals 6 already contain a mixture of the three primary colors, an excitation signal 15 can be simultaneously generated and sent to the red 100, green 110 and blue 120 photodetectors for capturing the corresponding red, green and blue parts of the exposure signals 6. Hence, in a conventional design, signaling lines 105, 115 and 125 can be connected together so that excitation signal 15 can be simultaneously applied to the respective red 100, green 110 and blue 120 photodetectors.

FIG. 1B is a timing diagram showing the relationship between the excitation signal 6 and the CCD photodetector 15 of FIG. 1A. Since the red 100, green 110 and blue 120 photodetectors are connected together, they will be simultaneously triggered by the same excitation signal 15. For example, as shown in FIG. 1B, when pulses 132, 134, 136, 138, 140, 142 and 144 are produced, three photodetectors including red, green and blue will all be triggered. Because each excitation signal has a cycle time $T_1$, the extraction of a particular color from the image cannot be conducted at a time interval greater than $T_1$. In other words, the light exposure, trigger and data extraction cycle for each CCD photodetector must be finished before the end of a cycle $T_1$.

As an illustration, assume that before the pulse 132 is generated, all three photodetectors are in the light-gathering state. Furthermore, assume that the time from the generation of pulse 132 to the beginning of the next pulse 134 represents a full cycle $T_1$. Within the cycle time $T_1$, all three photodetectors have already completed their respective light gathering operations. Therefore, when pulse 132 arrives, all three CCD photodetectors 100, 110 and 120 are simultaneously triggered. Thereafter, if red light needs to be extracted from the image, the red light from the image can be captured by the red photodetector 100. Moreover, the next round of light exposure is carried out within the cycle time $T_1$ marked by pulse 132 and pulse 134. Within the cycle time $T_1$ between pulse 132 and the next pulse 134, again all three photodetectors have completed a photodetection operation. Hence, when the next pulse 134 arrives, all three CCD photodetectors 100, 110 and 120 are simultaneously triggered. Thereafter, if green light needs to be extracted from the image, the green light from the image can be captured by the green photodetector 110. Moreover, the next round of light exposure is carried out within the cycle time $T_1$ marked by pulse 134 and pulse 136. Using similar operational steps, when the next pulse 136 arrives, the blue light from the image can be captured by the blue photodetector 110. By repeating the above steps, three primary colors of an image can be continuously captured and converted to primary color data. Subsequently, when the stream of three primary color data are properly recombined back together, the original color picture is reproduced.

In the conventional method, the same excitation signal is used to trigger red, green and blue CCD photodetectors. Therefore, the period from light exposure to data extraction for each photodetector must not exceed one excitation cycle. From an alternate viewpoint, since all three CCD photodetectors are triggered by the same excitation signal, each one of the photodetectors is constrained to work together with the other photodetectors. In other words, light exposure is limited to a period within one excitation signal cycle. To achieve the image capture within constraints, exposure time of the CCD photodetectors must match the excitation signal. In a world where the quality and speed of scanners are both critical for market success, production cost of a CCD module is bound to increase and thus may lower its power to compete in the market.

Furthermore, in order to complete the exposure of CCD photodetectors within a short interval, the necessary light intensity of the light source must be increased. A light source having a high intensity is not only expensive, but also consumes more power and generates a higher surrounding temperature due to heating. Consequently, the working life of electronic devices will be shortened.

In addition, in order to shorten the exposure time and to increase scanning signal precision so that the quality and speed of operation of a scanner can be maintained, optical elements, CCD module and other related devices must be designed to have a high signal-to-noise (S/N) ratio. Consequently, the production cost of the scanner is raised.

In summary, a conventional light exposure control device has the following defects:

1. A high-intensity light source is required, leading to large power consumption and high operating temperature, thereby shortening the working life of electronic devices.

2. The signal-to-noise (S/N) ratio of optical elements and CCD modules has to be increased, thereby increasing production cost.

3. To capture a clear image from the CCD within a short interval requires highly sensitive photodetectors, thereby leading to an increase in production cost and a decrease in its ability to compete in the market.

In light of the foregoing, there is a need to improve light exposure control device.

SUMMARY OF THE INVENTION

Accordingly, the present invention provides a light exposure control device so that the length of exposure for each CCD photodetector can be extended without affecting scanning speed. In addition, the signal-to-noise (S/N) ratio can be increased without increasing the production cost of a CCD module. Therefore, competitiveness in the market will soar.

In a second aspect, the present invention provides a light exposure control device that permits the use of a lower-intensity light source so that power consumption and operating temperature can be reduced. Hence, working life of electronic components can be extended.

In a third aspect, the present invention provides a light exposure control device capable of using devices having a lower signal-to-noise (S/N) ratio so that production cost is lower and commercial value is higher.

To achieve these and other advantages and in accordance with the purpose of the invention, as embodied and broadly described herein, the invention provides a light exposure control device. The light exposure control device is capable of delivering three independent excitation signals from a counter so that a red photodetector, a green photodetector and a blue photodetector can be triggered separately. Since each excitation signal delivered to each CCD photodetector is independent from each other, and each CCD photodetector furthermore reacts to a specific excitation signal, the CCD photodetector is able to avert the effect of other unrelated excitation signals. Therefore, the length of exposure for each CCD photodetector is greatly increased. In addition, the excitation signals can be generated by an oscillator or a frequency generator.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
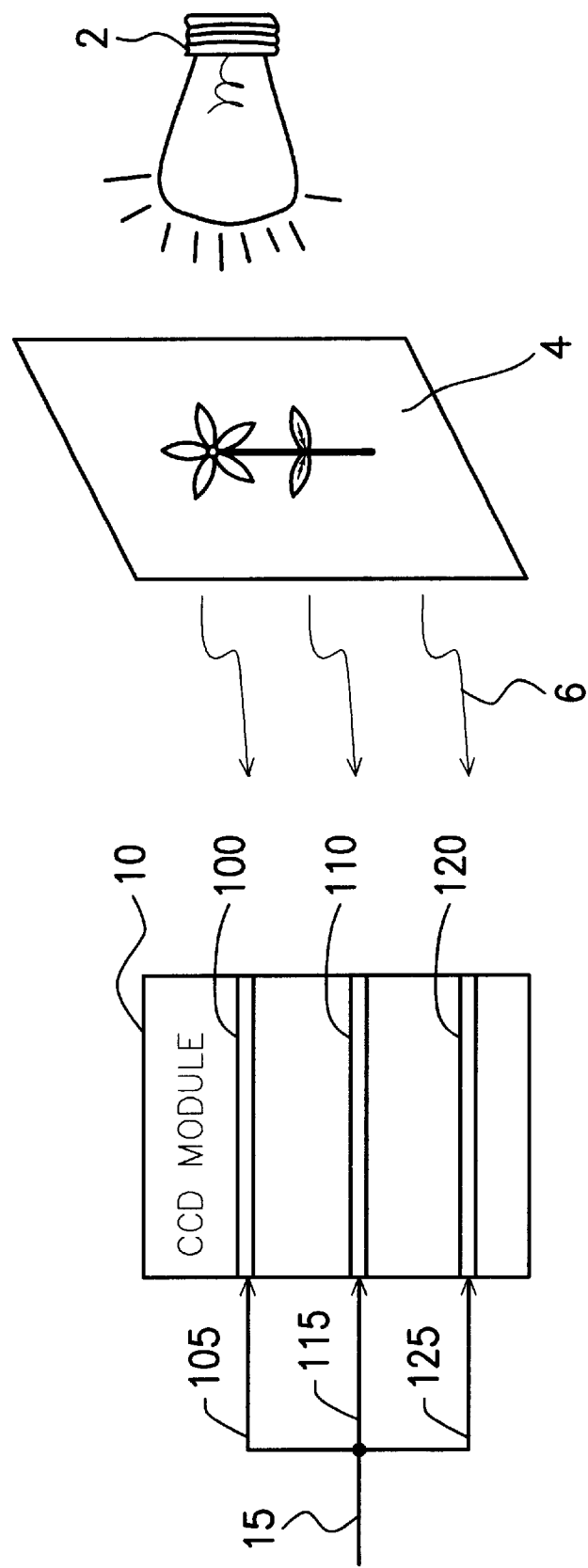
FIG. 1A illustrates the method of excitation for a conventional CCD module.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
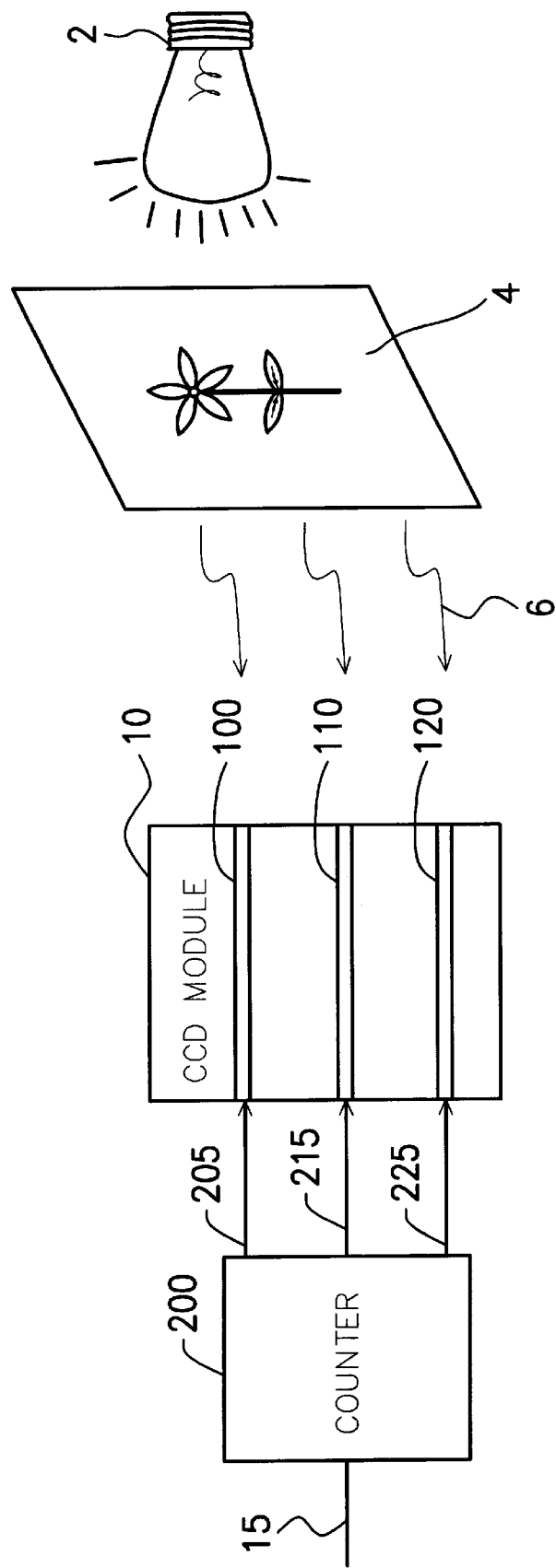
FIG. 2A shows a light exposure control device according to one preferred embodiment of this invention.

FIG. 2A shows a light exposure control device according to one preferred embodiment of this invention. As shown in FIG. 2A, when a picture 4 is illuminated by a light source 2, exposure signals 6 are generated. Unlike conventional methods, this invention utilizes a counter 200 to separately control the triggering of each CCD photodetector. In operation, the counter 200 receives excitation signal 15 and then uses signal lines 205, 215 and 225 to respectively trigger a red photodetector 100, a green photodetector 110 and a blue photodetector 120. Therefore, the red part of the exposure signals 6 can be independently captured and output from the red photodetector 100, the green part of the exposure signals 6 can be independently captured and output from the green photodetector 110, and the blue part of the exposure signals 6 can be independently captured and output from the blue photodetector 120. The excitation signals mentioned above can be generated by an oscillator or a frequency generator.

For example, when only red image signals are required, an excitation signal is delivered to the red photodetector 100 so that the red image signals can be captured. Because green image signals and blue image signals are unwanted, there is no need to trigger the green or the blue photodetector. Similarly, the method by which the CCD photodetectors are triggered to extract green or blue image signals is the same. The main advantages of this excitation method is that whether a CCD photodetector is triggered or not depends on the need for any one of the three primary color signals, and each can be independently triggered. With independent triggering, each CCD photodetector can work separately thereby saving unnecessary excitation and light exposure activities in other CCD photodetectors.

Figure 1B:
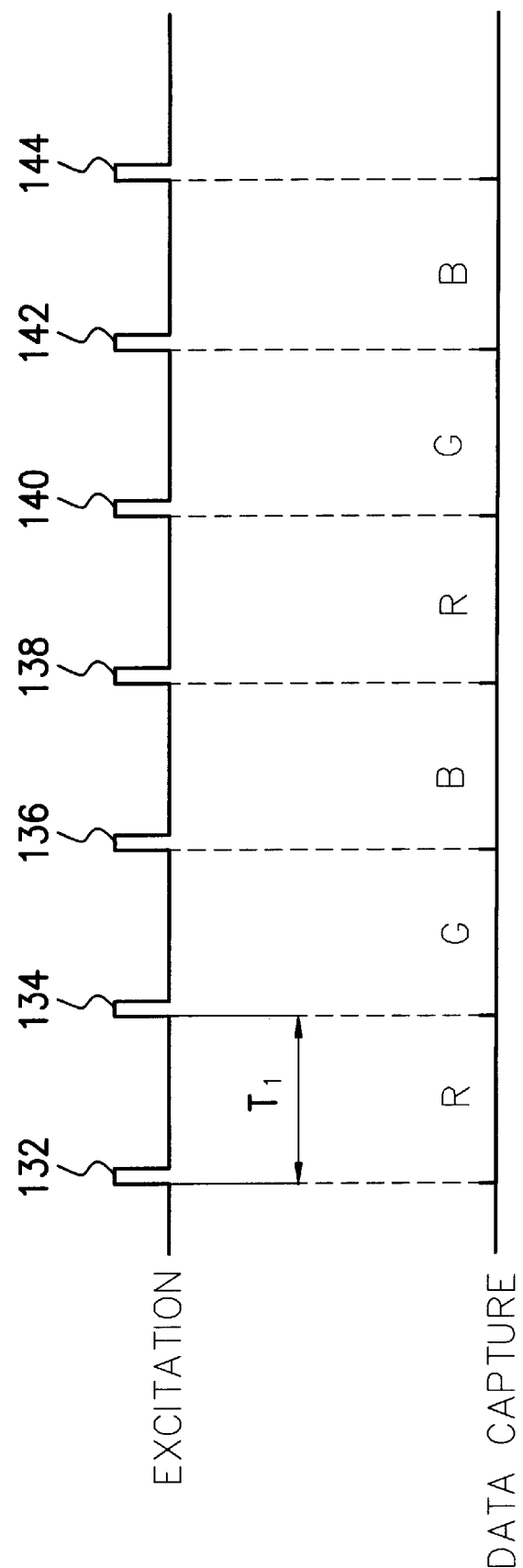
FIG. 1B is a timing diagram showing the relationship between the excitation signal and the CCD photodetector of FIG. 1A.
Figure 2B:
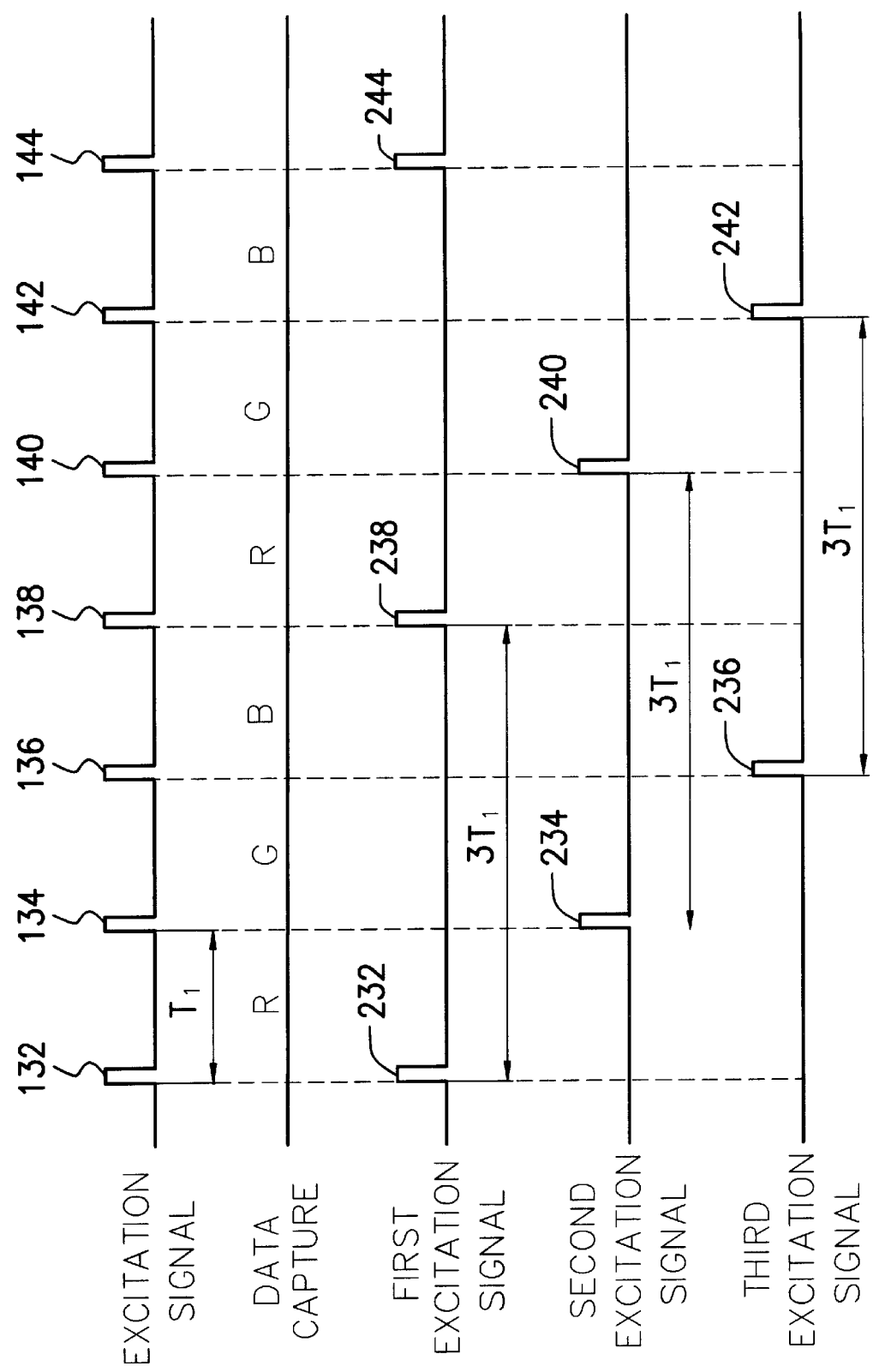
FIG. 2B is a timing diagram showing the relationship between the excitation signal and the three primary color excitation signals for the device as shown in FIG. 2A.

FIG. 2B is a timing diagram showing the relationship between the excitation signal 15 and the three primary color excitation signals for the device as shown in FIG. 2A. As shown in FIG. 2B, the excitation signal profile is the same as in FIG. 1B. However, in this invention, an additional counter 200 capable of receiving an excitation signal 15 and generating three different excitation signals is installed. Through the actions of three excitation signals, three CCD photodetectors can be triggered independently. The relationship between the excitation signals are: a first excitation signal passes through a first signal line 205 to trigger the red photodetector 100; the second excitation signal passes through a second signal line 215 to trigger the green photodetector 110; and a third excitation signal passes through a third signal line 225 to trigger the blue photodetector 120. As shown in FIG. 2B, through the action of counter 200, only one of the three excitation signals is triggered within one cycle time $T_1$ of excitation signal 15. In other words, only one of the three excitation signals that includes the first excitation signal, the second excitation signal or the third excitation signal is selected for triggering within one cycle time $T_1$. The method of triggering using a counter 200 is one major aspect of this invention.

As an illustration, assume that before the pulse 132 is generated, all three photodetectors are in the light-gathering state. When red image signals need to be extracted, the first excitation signal is delivered to the red photodetector 100. As soon as pulse 232 arrives, the red photodetector 100 is triggered, permitting the output of stored red image signals to be registered before the arrival of pulse 232. Within the cycle from pulse 232 to 238, there will be sufficient time for the red photodetector 100 to charge up again through light exposure and get ready for the next round of red image signals extraction. As soon as the next pulse 238 arrives, stored red image signals from a previous cycle can be extracted, and then the next round of light exposure is initiated. Within the cycle from pulse 238 to 244, there will be sufficient time for the red photodetector 100 to charge up again through light exposure and get ready for the next round of red image signals extraction. As soon as the next pulse 244 arrives, stored red image signals from a previous cycle can be extracted, and then the next round of light exposure is initiated again.

Similarly, when green image signals need to be extracted, the second excitation signal is delivered to the green photodetector 110. As soon as pulse 234 arrives, the green photodetector 110 is triggered permitting the output of stored green image signals to be registered before the arrival of pulse 234. Within the cycle from pulse 234 to 240, there will be sufficient time for the green photodetector 110 to charge up again through light exposure and get ready for the next round of green image signals extraction. As soon as the next pulse 240 arrives, stored green image signals from a previous cycle can be extracted, and then the next round of light exposure is initiated. Similarly, when pulse 236 arrives, the blue photodetector 120 is triggered permitting the output of stored blue image signals registered before the arrival of pulse 236. Within the cycle from pulse 236 to 242, there will be sufficient time for the blue photodetector 120 to charge up again through light exposure and get ready for the next round of blue image signals extraction. As soon as the next pulse 242 arrives, stored blue image signals from a previous cycle can be extracted, and then the next round of light exposure is initiated.

The sequence of excitations shown in FIG. 2B can be regarded as a reference only. In practice, since all three CCD photodetectors can be independently triggered, image data for any one color can be extracted by triggering the corresponding CCD photodetector any time as required. Hence, the actual triggering sequence may not need to follow any order.

Since all three CCD photodetectors are separately triggered, whenever the same image signals are captured, this invention is capable of extending the exposure of a CCD photodetector up to 3 times the conventional method. Hence, the light exposure control device of this invention is able to provide sufficient exposure time for the CCD photodetector to gather light signals 6 for obtaining a clearer and more complete picture.

In summary, the advantages of this invention include:

1. Exposure time for the CCD photodetector is extended so that the extracted image data can be clearer and more complete. With a longer exposure time, the CCD photodetector can have a lower sensitivity, thereby lowering the cost of production for the CCD module. Hence, the product is more competitive.

2. With extended exposure time, light intensity of light source can be lower. Therefore, power can be saved and the operating temperature can be reduced. Thus, operational life of electronic devices is longer.

3. With longer exposure time, optical elements, CCD module and other related devices can have a smaller signal-to-noise (S/N) ratio. Hence, both the quality and speed of operation for a scanner can be maintained while the production cost can be lowered. Consequently, the product can better compete in the market.

Although a CCD photodetector is used to explain the operation of the light exposure control device in the above, other photosensitive devices having similar functions (for example, CIS photodetector) can be used in the above invention as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light exposure control device for capturing exposure signals from a picture, comprising:
    a signal generator for receiving an excitation signal, said signal generator being capable of sending out a first excitation signal to a first signal line, a second excitation signal to a second signal line, and a third excitation signal to a third signal line, wherein within one cycle of the excitation signal, either the first excitation signal or the second excitation signal or the third excitation signal is triggered;
    a charge coupled device (CCD) chip, further comprising:
        a first photodetector sensitive to red light for gathering exposure signals, wherein the first photodetector is connected to the first signal line, and on arrival of the first excitation signal, outputs first image signals that correspond with the gathered exposure signals;
        a second photodetector sensitive to green light for gathering exposure signals, wherein the second photodetector is connected to the second signal line, and on arrival of the second excitation signal, outputs second image signals that correspond with the gathered exposure signals; and
        a third photodetector sensitive to blue light for gathering exposure signals, wherein the third photodetector is connected to the third signal line, and on arrival of the third excitation signal, outputs third image signals that correspond with the gathered exposure signals.

2. The device of claim 1, wherein the excitation signal is generated by a counter.

3. A light exposure control device for capturing exposure signals from a picture, comprising:
    a signal generator for receiving an excitation signal, and capable of sending out a first excitation signal to a first signal line and a second excitation signal to a second signal line, wherein within one cycle of the excitation signal, either the first excitation signal or the second excitation signal is triggered;

a charge coupled device (CCD) chip, further comprising:

a first photodetector sensitive to a first color light for gathering exposure signals, wherein the first photodetector is connected to the first signal line, and on arrival of the first excitation signal, outputs first image signals that correspond with the gathered exposure signals; and a second photodetector sensitive to a second color light for gathering exposure signals, wherein the second photodetector is connected to the second signal line, and on arrival of the second excitation signal, outputs second image signals that correspond with the gathered exposure signals.

4. The device of claim 3, wherein the excitation signal is generated by a counter.

5. A light exposure control device for capturing exposure signals from a picture, comprising:

a signal generator for receiving an excitation signal, and then sending out a first excitation signal to a first signal line within the first cycle of the excitation, sending out a second excitation signal to a second signal line within the second cycle of the excitation, and sending out a third excitation signal to a third signal line within the third cycle of the excitation;

a charge coupled device (CCD) chip, further comprising:

a first photodetector sensitive to red light for gathering exposure signals, wherein the first photodetector is connected to the first signal line, and on arrival of the first excitation signal, outputs first image signals that correspond with the gathered exposure signals;

a second photodetector sensitive to green light for gathering exposure signals, wherein the second photodetector is connected to the second signal line, and on arrival of the second excitation signal, outputs second image signals that correspond with the gathered exposure signals; and a third photodetector sensitive to blue light for gathering exposure signals, wherein the third photodetector is connected to the third signal line, and on arrival of the third excitation signal, outputs third image signals that correspond with the gathered exposure signals.

6. A method for controlling light exposure capable of capturing exposure signals from a picture, comprising the steps of:

providing an excitation signal;

generating a first excitation signal, a second excitation signal and a third excitation signal to a charge coupled device (CCD) chip according to an excitation signal, wherein within one cycle of the excitation signal, either the first excitation signal, or the second excitation signal or the third excitation signal is triggered;

outputting first image signals sensitive to red light that correspond to the exposure signals from the CCD chip on arrival of the first excitation signal;

outputting second image signals sensitive to green light that correspond to the exposure signals from the CCD chip on arrival of the second excitation signal; and outputting third image signals sensitive to blue light that correspond to the exposure signals from the CCD chip on arrival of the third excitation signal.

7. A method for controlling light exposure capable of capturing exposure signals from a picture, comprising the steps of:

providing an excitation signal;

generating a first excitation signal and a second excitation signal to a charge coupled device (CCD) chip according to an excitation signal, wherein within one cycle of the excitation signal, either the first excitation signal or the second excitation signal is triggered;

outputting first image signals sensitive to a first color light that correspond to the exposure signals from the charge coupled device (CCD) chip on arrival of the first excitation signal; and outputting second image signals sensitive to a second color light that correspond to the exposure signals from the CCD chip on arrival of the second excitation signal.

8. A method for controlling light exposure capable of capturing exposure signals from a picture, comprising the steps of:

providing an excitation signal;

outputting a first excitation signal within the first cycle of the excitation signal to a charge coupled device (CCD) chip;

outputting a second excitation signal within the second cycle of the excitation signal to the CCD chip;

outputting a third excitation signal within the third cycle of the excitation signal to the CCD chip;

outputting first image signals sensitive to red light that correspond to the exposure signals from the CCD chip on arrival of the first excitation signal;

outputting second image signals sensitive to green light that correspond to the exposure signals from the CCD chip on arrival of the second excitation signal; and outputting third image signals sensitive to blue light that correspond to the exposure signals from the CCD chip on arrival of the third excitation signal.

* * * * *